United States Patent
Huang et al.

(10) Patent No.: US 8,365,199 B2
(45) Date of Patent: Jan. 29, 2013

(54) METHOD AND SYSTEM FOR SUPPORTING MULTIPLE DISPLAY DEVICES

(75) Inventors: Jinliang Huang, Shanghai (CN); Liang Tang, Shanghai (CN)

(73) Assignee: S3 Graphics Co., Ltd., Grand Cayman ( * ) Notice: Subject to any disclaimer, the term of this patent is extended or adjusted under 35 U.S.C. 154(b) by 1011 days.

(21) Appl. No.: 12/344,284

(22) Filed: Dec. 26, 2008

(65) Prior Publication Data

US 2009/0172707 A1 Jul. 2, 2009

Related U.S. Application Data

(60) Provisional application No. 61/017,806, filed on Dec. 31, 2007.

(51) Int. Cl.
*G06F 3/00* (2006.01)

(52) U.S. Cl. .......................... 719/320; 719/327

(58) Field of Classification Search .................. 719/321, 719/320, 327
See application file for complete search history.

(56) References Cited

U.S. PATENT DOCUMENTS

| | | | | |
|---|---|---|---|---|
| 5,991,542 A | * | 11/1999 | Han et al. | 717/167 |
| 6,061,770 A | * | 5/2000 | Franklin | 711/162 |
| 6,222,529 B1 | * | 4/2001 | Ouatu-Lascar et al. | 715/745 |
| 7,020,798 B2 | * | 3/2006 | Meng et al. | 714/6.31 |
| 7,945,917 B2 | * | 5/2011 | Shoji et al. | 719/321 |
| 2004/0212610 A1 | * | 10/2004 | Hamlin | 345/211 |
| 2006/0242270 A1 | * | 10/2006 | Sankaranarayan et al. | 709/220 |
| 2006/0282577 A1 | * | 12/2006 | Huang et al. | 710/62 |

FOREIGN PATENT DOCUMENTS

WO 2006129676 12/2006

OTHER PUBLICATIONS

Braulio Adriano de Mello, Tangram:Virtual Integration of IP Components in a Distributed Cosimulation Environment, 2006.*
"Office Action of Taiwan Counterpart Application", issued on Nov. 7, 2012, p1-p9, in which the listed reference was cited.

* cited by examiner

*Primary Examiner* — Lechi Truong
(74) *Attorney, Agent, or Firm* — Jianq Chyun IP Office

(57) ABSTRACT

A method and a system for supporting multiple display adapters in the WDDM architecture are provided. A driver wrapper serves as the interface between the OS and the display drivers. The driver wrapper hides the display drivers from the knowledge of the OS and provides the standard display driver interface (DDI) to the OS. In the view of the OS, the driver wrapper is the single common driver which receives requests from the OS. The driver wrapper dispatches the requests from the OS to the display drivers and relays responses from the display drivers to the OS. The driver wrapper of the present invention is compatible with multiple distinct display drivers.

12 Claims, 4 Drawing Sheets

METHOD AND SYSTEM FOR SUPPORTING MULTIPLE DISPLAY DEVICES

CROSS-REFERENCE TO RELATED APPLICATION

This application claims the priority benefit of U.S. provisional application Ser. No. 61/017,806, filed on Dec. 31, 2007. The entirety of the above-mentioned patent application is hereby incorporated by reference herein and made a part of this specification.

BACKGROUND OF THE INVENTION

1. Field of the Invention

The present invention relates to multiple-adapter multiple-monitor (MAMM) support based on Windows Display Driver Model (WDDM). More particularly, the present invention relates to supporting multiple display adapters from different manufacturers in the WDDM architecture.

2. Description of the Related Art

As the performance of personal computers (PCs) and the demands from users increase, there are usually a lot of applications running on a single PC at the same time. Sometimes the desktop area of the operating system gets crowded. For this issue, there is a trend to connect multiple display monitors to a single PC simultaneously in order to widen the desktop area.

Recent versions of the Microsoft Windows operating system support multiple-adapter multiple monitor (MAMM) to solve above addressed issue. For example, XP Display Driver Model (XDDM) of the Microsoft Windows XP operating system supports MAMM; Windows Display Driver Model (WDDM) of the Microsoft Windows Vista operating system also supports MAMM. However, in WDDM the multiple display adapters have to be driven by a single common display driver. This is relatively easy for display adapters from the same manufacturer, since the manufacturer can fix its own display driver to drive multiple display adapters of the same manufacturer identification. On the other hand, using several display adapters from different manufacturers in Windows Vista is not so easy, since it is impractical to expect the manufacturers to cooperate to provide a common driver. In Windows Vista, the only solution is using multiple XDDM display drivers to drive multiple display adapters from different manufacturers because XDDM does not impose the single-driver requirement. However, XDDM display drivers do not support the latest WDDM architecture and do not support some latest software, such as DirectX 10.

SUMMARY OF THE INVENTION

Accordingly, the present invention provides a method and a system in a computer system for supporting multiple display devices.

According to an embodiment of the present invention, a method for supporting multiple-adaptor multiple monitor in a computer system is provided. The method comprises initializing an operating system, sending a request from the operating system to a driver wrapper, determining an identification of the request by the driver wrapper, forwarding the request to a display driver according to the identification, and driving a display device to perform the request by the display driver.

In an embodiment of the present invention, the initializing step further comprises loading a filter driver, intercepting an I/O request from the display driver by the filter driver, transmitting data related to the identification of the display driver to the driver wrapper, and transmitting identification of the driver wrapper to the operating system.

In an embodiment of the present invention, the method further comprises storing the data related to the identification of the display driver in the driver wrapper, wherein the identification of the request is determined according to the stored data.

In an embodiment of the present invention, the identification is a DDI function address, a manufacturer ID, or a model ID, wherein each of the display devices possesses unique identifications.

In an embodiment of the present invention, each of the display drivers corresponds to one or more display devices.

In an embodiment of the present invention, the operating system is Windows Vista or Windows XP.

According to an embodiment of the present invention, a graphics system for supporting multiple display devices is provided. The graphics system comprises a first display driver, a second display driver, a subsystem of an operating system, and a driver wrapper. The first display driver is configured to drive a first display device. The second display driver is configured to drive a second display device. The subsystem of the operating system is configured to send a request. The driver wrapper is configured to determine and dispatch the request according to a function address of the request. The request is forwarded to the first display driver if the function address is determined as corresponding to the first display device, and the request is forwarded to the second display driver if the function address is determined as corresponding to the second display device.

In an embodiment of the present invention, the driver wrapper is further configured to return response corresponding to the request from the first display driver and/or the second display driver to the subsystem of the operating system.

In an embodiment of the present invention, the first display driver comprises a first user-mode driver and a first kernel-mode driver. The second display driver comprises a second user-mode driver and a second kernel-mode driver. The driver wrapper comprises a user-mode driver wrapper and a kernel-mode driver wrapper. The user-mode driver wrapper is corresponding to the first user-mode driver and the second user-mode driver. The kernel-mode driver wrapper is corresponding to the first kernel-mode driver and the second kernel-mode driver.

In an embodiment of the present invention, the user-mode driver wrapper dispatches the request from the subsystem of the operating system to one of the first user-mode driver and the second user-mode driver, and the kernel-mode driver wrapper dispatches the request from the subsystem of the operating system to one of the first kernel-mode driver and the second kernel-mode driver.

In an embodiment of the present invention, the first display driver further comprises a first installed client display driver and the second display driver further comprises a second installed client display driver, and wherein the driver wrapper further comprises an installed client display driver wrapper corresponding to the first installed client display driver and the second installed client display driver.

In an embodiment of the present invention, the installed client display driver wrapper dispatches the request from the subsystem of the operating system to one of the first installed client display driver and the second installed client display driver.

According to an embodiment of the present invention, a computer system in multiple-adaptor multiple monitor architecture is provided. The computer system comprises an operating system, a driver wrapper unit, and a graphics driver unit. The operating system is configured to send requests. The driver wrapper unit is coupled to the operating system and is configured to receive the requests from the operating system. The graphics driver unit is coupled to the driver wrapper unit and comprises user-mode drivers and kernel mode drivers. The graphics driver unit is configured to receive the request from the driver wrapper unit and process the requests. The driver wrapper unit is configured to dispatch requests from the operating system to the user-mode drivers and transmit responses from the user-mode drivers to the operating system, and is configured to dispatch requests from the operating system to the kernel-mode drivers and transmit responses from the kernel mode drivers to the operating system.

In an embodiment of the present invention, the computer system further comprises a graphics hardware unit driven by the graphics driver unit. The graphics hardware unit comprises a plurality of display devices. Each of the display devices is driven by a corresponding user-mode driver and a corresponding kernel-mode driver. The driver wrapper unit dispatches the requests to the user-mode driver and the kernel-mode driver corresponding to the display device assigned to perform the requests.

In an embodiment of the present invention, the driver wrapper unit dispatches requests from a graphics application programming interface of the operating system to the user-mode drivers and dispatches requests from a graphics kernel of the operating system to the kernel-mode drivers. The driver wrapper unit maintains correspondence of display driver interface function addresses of the requests and the kernel mode drivers.

In an embodiment of the present invention, the computer system supports MAMM based on the WDDM architecture of the OS.

In the aforementioned method and system, a driver wrapper unit serves as the interface between the OS and the display drivers. The driver wrapper unit hides the display drivers from the knowledge of the OS and provides the standard display driver interface (DDI) to the OS. In the view of the OS, the driver wrapper unit is the single common driver which receives requests from the OS. The driver wrapper unit dispatches the requests from the OS to the display drivers and relays responses of the display drivers to the OS. The driver wrapper unit of the present invention is compatible with display drivers from any manufacturer. Consequently, the present invention enables the support of multiple display adapters in the WDDM architecture of the Microsoft Windows Vista operating system, wherein the display adapters may belong to different manufacturers and different design models. Moreover, the present invention does not require any modification of existing display drivers.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
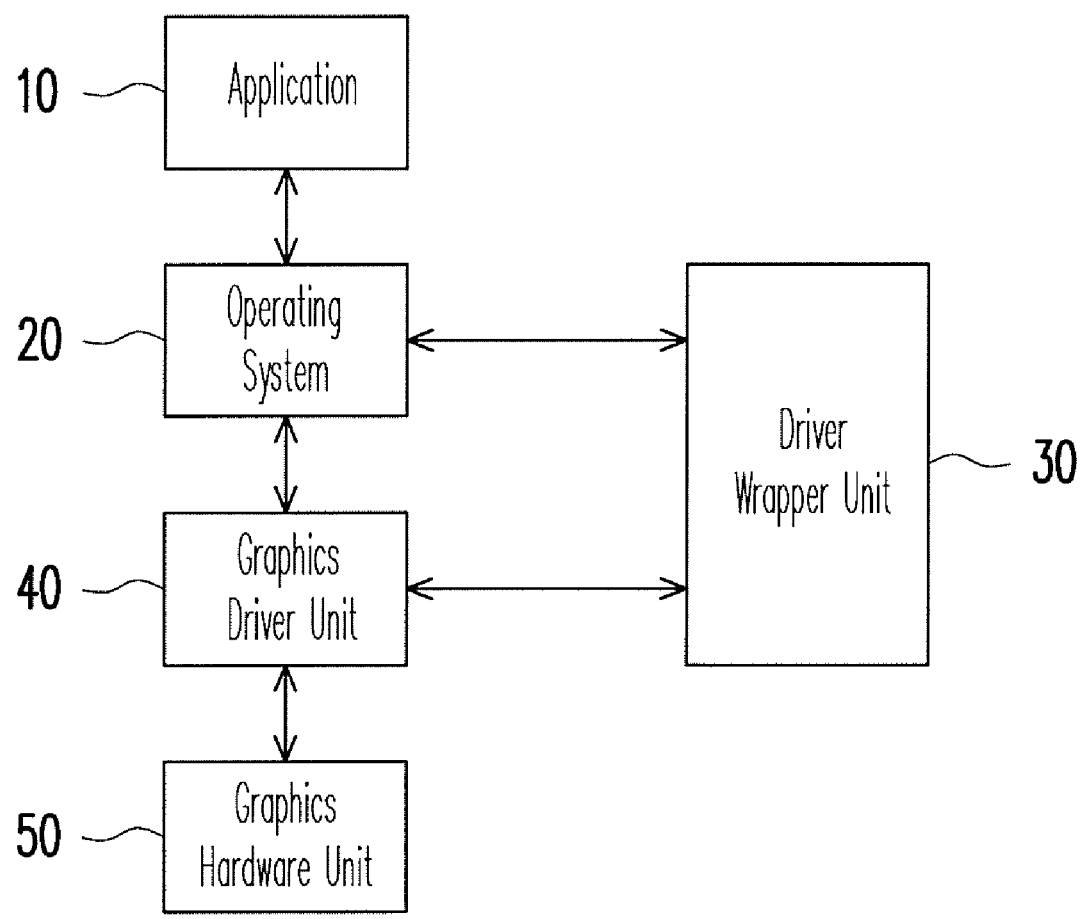
FIG. 1 is a high-level block diagram of a graphics system according to an embodiment of the present invention for supporting multiple display devices.

Reference will now be made in detail to the present embodiments of the invention, examples of which are illustrated in the accompanying drawings. Wherever possible, the same reference numbers are used in the drawings and the description to refer to the same or like parts.

FIG. 1 depicts a block diagram of a graphics system according to an embodiment of the present invention for supporting multiple display devices. The graphics system comprises at least an application 10, an operating system 20, a driver wrapper unit 30, a graphics driver unit 40 and a graphics hardware unit 50. The application 10 is coupled to the OS 20, and the OS 20 is further coupled to the driver wrapper unit 30. The driver wrapper unit 30 communicates between the OS 20 and the graphics driver unit 40 which connects to the graphics hardware unit 50.

The graphics hardware unit 50 may include multiple display devices. Each of the display devices may be coupled to a display driver respectively, in the case that these display devices are from different manufacturers. Therefore, the graphics driver unit 40 may include a plurality of display drivers corresponding to the display devices connected thereto respectively. As described above, display devices from different manufacturers may require different display drivers in order to work properly with the OS 20. However, the OS 20 can only respond to a single display driver in the case that multiple display drivers exist. In this case, the driver wrapper unit 30 functions as a common driver interface between the OS 20 and the multiple display drivers. Accordingly, the driver wrapper unit 30 is regarded as the single display driver existing to the OS 20. In response to requests issued from the OS 20, the driver wrapper unit 30 forwards the requests to a corresponding display driver in the graphics driver unit 40 for processing.

According to an embodiment of the present invention, the OS 20 issues a request containing an identification which indicates the display device that the request is directed to. In other words, each display device in the graphics hardware unit 50 is assigned with a unique identification. The OS 20 may identify all existing display devices connecting to the computer system and thus issues requests to proper display devices by use of the identification. The driver wrapper unit 30 receives the request sent from the OS 20 and determines which display driver in the graphics driver unit 40 the request should be directed to according to the identification. Once the driver wrapper unit 30 confirms the correct display driver and forward the request, the display driver may perform the request so that the corresponding display device can respond to the OS 20.

According to an embodiment of the present invention, some of the display devices in the graphics hardware unit 50 may correspond to the same display driver in the graphics driver unit 40. For example, several display devices of the same manufacturer may be connected to the computer system while the other display devices are from different manufactures in between. Display devices of the same manufacturer may be driven by a common display driver, thus the number of the display drivers decreases. However, display devices driven by the same display driver still possess unique identification independently. When a request is issued from the OS 20, the driver wrapper unit 30 forward the request to the corresponding display driver according to the identification. In this case, several identifications may correspond to the same display driver. The driver wrapper unit 30 may construct a mapping table of identifications to the display devices and the display drivers. While receiving a request, the driver wrapper unit 30 determines the identification by use of the mapping table.

Figure 2:
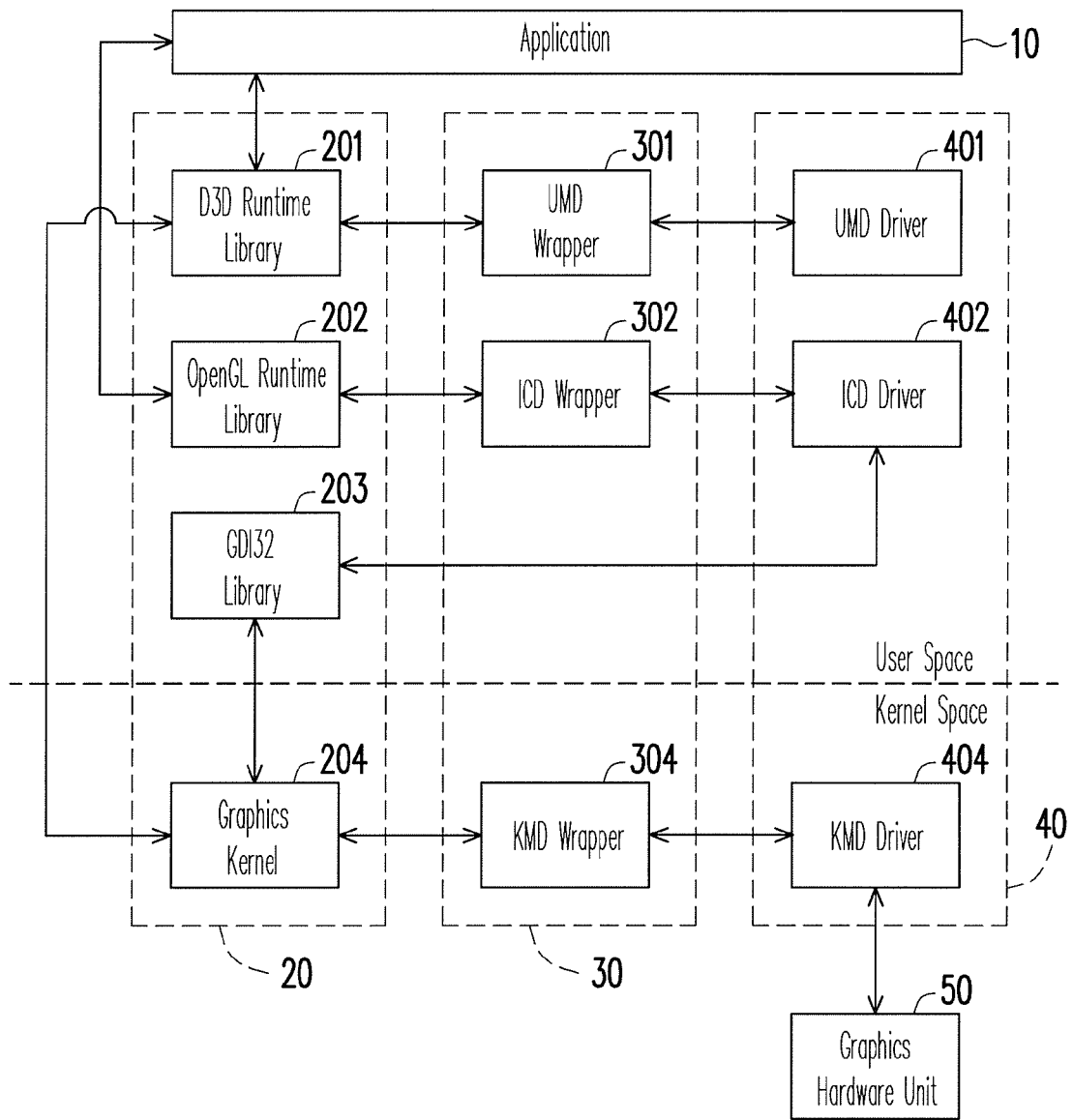
FIG. 2 is a schematic diagram showing a graphics system supporting multiple display devices according to an embodiment of the present invention.

While the high-level embodiments of the present invention are described above, the following illustrates other embodiments in more detail. FIG. 2 is a schematic diagram showing a graphics system supporting multiple display devices according to an embodiment of the present invention, for example WDDM architecture in particular. Similar as FIG. 1, the graphics system according to an embodiment of the present invention comprises application 10, a subsystem of the OS 20, a driver wrapper unit 30 and a graphics driver unit 40. The graphics system of a computer in general includes two major components, the kernel space and the user space as separated by the dotted line. The kernel space interacts with the graphics hardware directly. However, the user space is isolated and has no direct access to the graphics hardware, such as a graphics adaptor and/or a display monitor.

The subsystem of the OS 20 comprises at least a Direct3D (D3D) runtime library 201, an Open GL runtime library 202, a Windows graphical device interface (GDI) client dynamic link library (GDI32 DLL) 203 and a graphics kernel 204. The driver wrapper unit 30 comprises at least a user-mode display driver (UMD) wrapper 301, an OpenGL installed client display driver (ICD) wrapper 302 and a kernel mode display driver (KMD) wrapper 304. The graphics driver unit 40 comprises at least a UMD driver 401, an ICD driver 402 and a KMD driver 402. The graphics kernel 204, KMD wrapper 304 and KMD driver 402 reside in the kernel space while the remaining components reside in the user space. The driver wrapper unit 30 may be installed in the OS (for example, Microsoft Windows Vista) and function as a common display driver. The UMD driver 401, ICD driver 402 and KMD driver 404 may be configured based on the graphics hardware connected to the computer system. Meanwhile the UMD wrapper 301, ICD wrapper 302 and KMD wrapper 303 are configured as interfaces between the UMD driver 401, ICD driver 402 and KMD driver 404 to interact with the subsystem of the OS 20.

The application 10 may send requests through the OS 20 to the graphics hardware unit 50 via two routes. The OS 20 may comprise application interfaces (API) such as D3D (which belongs to DirectX series), or OpenGL to interact with the applications. DirectX is developed by Microsoft, while OpenGL is developed by Silicon Graphics Inc. For a request in DirectX, it may be forward from the D3D runtime library 201 then sent to the UMD wrapper 301. As described above, the UMD wrapper 301 serves as an interface between the D3D runtime library 201 of the OS 20 and the UMD driver 401. Once the request is processed by the UMD driver 401, it will trace back through the UMD wrapper 301 then to the D3D runtime library 201 to complete process in the user space. The D3D runtime library 201 then forwards the request to the graphics kernel 204 in the kernel space, and eventually to the KMD driver 404 for driving the graphics hardware unit 50. The KMD wrapper 304 serves as an interface between the graphics kernel 204 and the KMD driver 404 for passing the request.

For a request in OpenGL, the request is forward from the OpenGL runtime library 202 through ICD wrapper 302, ICD driver 402 then to GDI32 DLL 203. Same as the UMD wrapper 301, the ICD wrapper 302 serves as an interface between the OpenGL runtime library 202 and the ICD driver 402. Here the GDI32 DLL 203 serves as an interface between OpenGL and DirectX in order to provide kernel-mode access. One of ordinary skill in the art would understand that OpenGL and DirectX (including D3D) are two distinct standards. OpenGL requests cannot be processed directly in DirectX environment, thus an interface like GDI32 DLL 203 is necessary. Same as D3D request, GDI32 DLL 203 forwards the request from user space to the graphics kernel 204 in kernel space. The graphics kernel 204 further forwards the request to the KMD wrapper 304, then to KMD driver 404 as described above.

According to an embodiment of the present invention, the UMD driver 401, ICD driver 402 and KMD driver 404 may comprises multiple drivers corresponding to multiple display devices respectively. For example, when two display devices from different manufacturers are connected to the computer system, each of the display devices may have corresponding UMD drivers 401, ICD drivers 402 and KMD drivers 404 respectively, rather than sharing the same driver. However, only one UMD wrapper 301, ICD wrapper 302 and KMD wrapper 304 exist between the subsystem of the OS 20 and the multiple drivers in the display driver unit 40. The UMD wrapper 301, ICD wrapper 302 and KMD wrapper 304 determine the corresponding display drivers that the request is directed to according to the identification of the request. The identification indicates the corresponding display device. The identification may be, for example, display driver interface (DDI) address of the display device.

The driver wrapper unit 30 only provides the standard display driver interface (DDI) in front of the OS 20. The actual operation of the request is not carried out directly by the driver wrapper unit 30, but by the underlying display drivers of the graphics driver unit 40. The driver wrapper unit 30 hides the display drivers from the knowledge of the OS 20 (details later). In the view of the OS, the driver wrapper unit 30 is the single common driver which receives requests from the OS. The driver wrapper unit 30 dispatches requests from the OS 20 to the display drivers and relays responses of the display drivers to the OS 20. The driver wrapper unit 30 is compatible with different display drivers from different manufacturers. In this way, computer system of the present invention is able to support multiple display devices provided by different manufacturers.

According to an embodiment of the present invention, the graphics kernel 204 is a Windows DirectX graphics kernel. The computer system is configured in WDDM architecture. The graphics system may support OpenGL and/or DirectX. According to an embodiment of the present invention, the OS 20 may be Windows XP, Windows Vista or any other operation system that supports MAMM.

Figure 3:
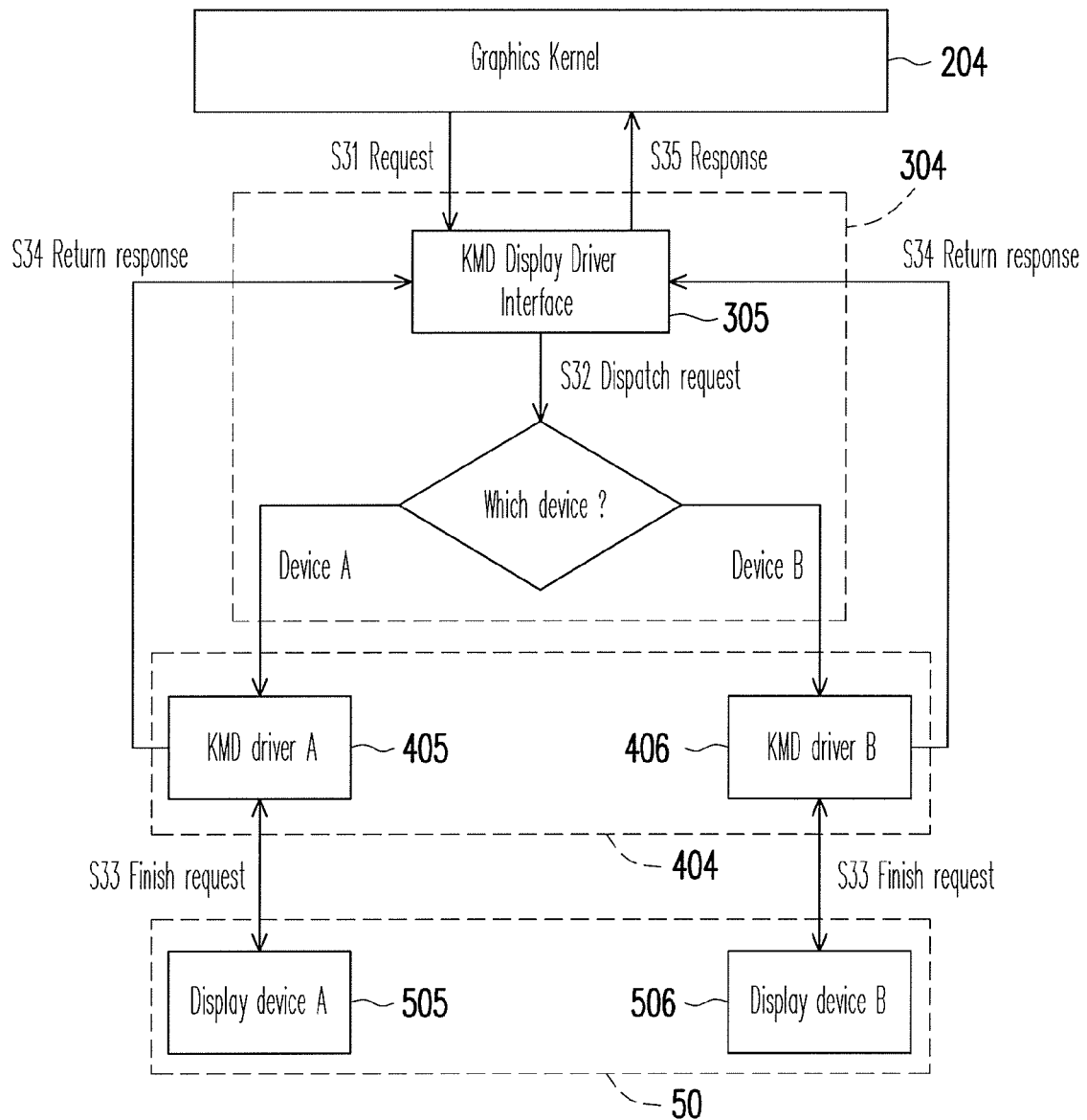
FIG. 3 is a schematic diagram showing the flow of dispatching a request in the kernel space according to an embodiment of the present invention.

Reference is now made to FIG. 3, which depicts a schematic diagram showing the flow of dispatching a request in the kernel space according to an embodiment of the present invention. First, upon receiving a request from the user space the graphics kernel 204 transmits the request to a KMD Display Driver Interface 305 of the KMD driver wrapper 304 (step S31). Next, the KMD driver wrapper 304 dispatches the operation request according to an identification indicated by the request. The identification may be a DDI address, manufacturer ID and/or model ID corresponding to a display device. In the embodiment of FIG. 3, the KMD driver 404 includes two drivers with different identifications, namely, the KMD driver A 405 for driving the display device A 505 and the KMD driver B 406 for driving the display device B

506. If the request is directed to the display device A 505, the KMD driver wrapper 304 dispatches the request to the KMD driver A 405. Otherwise, the KMD driver wrapper 304 dispatches the request to the KMD driver B 406 (step S32). Each of the display devices A and B may be a stand-alone display adapter installed in an expansion slot of the motherboard of a PC, an embedded display adapter integrated in the motherboard, or any other similar device.

Next, the KMD driver A or B controls its corresponding display device A or B to finish the request (step S33) and returns a response to the KMD driver wrapper 304 (step S34). The KMD driver wrapper 304 returns the response to the graphics kernel 204 (step S35). In this way, the KMD driver wrapper 304 serves a single common driver for the display device A 505 and the display device B 506 in view of the OS.

The UMD driver wrapper 301 and the ICD driver wrapper 302 dispatch requests from the OS 20 in similar ways as that of the KMD driver wrapper 304. Any person skilled in the art can comprehend the request dispatching of the driver wrapper unit 30 with the understanding of FIG. 1 and FIG. 2.

The driver wrapper unit 30 has to know the identification of the underlying graphics hardware before it can dispatch requests from the OS. The identification may be, for example, DDI address of the graphics hardware. This task is easy for the UMD driver wrapper 301 and the ICD driver wrapper 302 in the user space. The UMD driver wrapper 301 and the ICD driver wrapper 302 may call system functions to get the DDI addresses of the display devices, and thus dispatch the requests. For the KMD driver wrapper 304 in the kernel space, this task is more complex.

Figure 4:
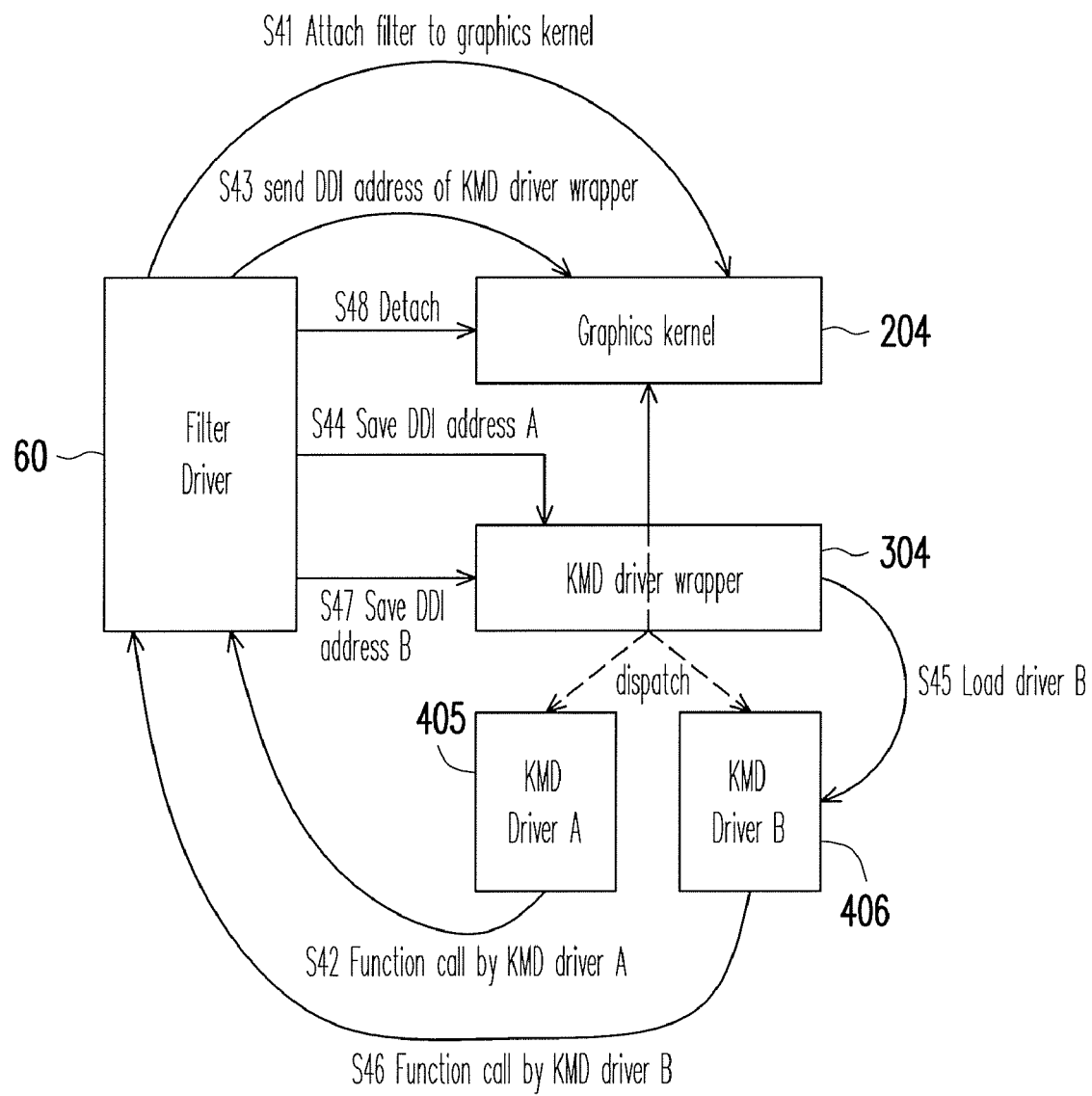
FIG. 4 is a schematic diagram showing the flow of obtaining the DDI function addresses from display drivers in the kernel space according to an embodiment of the present invention.

FIG. 4 is a schematic diagram showing the flow of obtaining the DDI addresses from display drivers in the kernel space according to an embodiment of the present invention. As described above, the OS 20 can only load and respond to a single display driver for operation even multiple display devices are connected to the computer system in WDDM. Whiling starting up, the OS 20 would load a KMD driver of a display device by calling its entry function. Each of the KMD drivers possesses an entry function. The entry function subsequently calls a system function to send an I/O request to the graphics kernel 204 by the KMD driver. In response to the I/O request, DDI function addresses corresponding to the display device are sent to the graphics kernel 204 for initialization. If the OS 20 attempts to load a second display device and finds that the display device is driven by another KMD display driver, the loading would fail and result in the second display device unable to work. To solve this problem, a filter driver 60 is installed to mask the second display driver from the OS 20 and still able to drive the second display device. The filter driver 60 intercepts the I/O requests and returns the graphics kernel 204 with the DDI function addresses of the KMD driver wrapper 304, while saving the real DDI function addresses of the display device to the KMD driver wrapper 304. As seen by the OS 20, the computer system is loaded with multiple display devices corresponding to a common display driver, i.e. the KMD driver wrapper 304.

Now return to the flow in FIG. 4. First, the filter driver 60 is attached to the graphics kernel 204 (step S41) so that the filter driver 60 can filter out and intercept initialization I/O requests from the KMD driver A 405 and/or the KMD driver B 406 to the graphics kernel 204. The filter driver 60 may be attached by calling a system function during start up according to an embodiment of the present invention. In another embodiment of the present invention, the filter driver 60 may be installed along with the driver wrapper unit 40. Yet in another embodiment of the present invention, the filter driver 60 may be installed alone, or loaded onto the graphics kernel 204.

Every KMD driver has a corresponding entry function. When the OS 20 starts up, it loads the KMD driver and calls its entry function. The entry function in turn calls a system function. The system function sends an I/O request to the graphics kernel 204 to transmit the DDI function addresses of the display device to the graphics kernel 204 in order to initialize. Since the filter driver 60 is attached to the graphics kernel 204 to filter out and intercept such initialization I/O requests, when the KMD driver A 405 is loaded by the OS 20, the DDI function addresses of the display device A 505 are received by the filter driver 60 (step S42).

Next, the filter driver 60 sends the DDI function addresses of the KMD driver wrapper 304 to the graphics kernel 204 so that the KMD driver wrapper 304 serves as the single common driver for receiving requests from the OS (step S43). Next, the filter driver 60 transmits the DDI function addresses of the display device A 505 to the KMD driver wrapper 304 so that the KMD driver wrapper 304 can save the DDI function addresses (step S44). From this moment the KMD driver wrapper 304 can dispatch requests to the KMD driver A 405 to drive the display device A 505 because the KMD driver wrapper 304 knows the DDI function addresses of the display device A 505.

As mentioned earlier, the KMD driver B 406 is masked to avoid being loaded by the OS. Instead, the KMD driver wrapper 304 loads the KMD driver B 406 by calling another system function (step S45). The process of loading the KMD driver B 406 is similar to the process of loading the KMD driver A 405. The I/O request of the KMD driver B 406 is intercepted by the filter driver 60 and the DDI function addresses of the display device B 506 are received by the filter driver 60 (step S46). Next, the filter driver 60 transmits the DDI function addresses of the display device B 506 to the KMD driver wrapper 304 so that the KMD driver wrapper 304 can save the DDI function addresses (step S47). From this moment the KMD driver wrapper 304 can dispatch requests to the KMD driver B 406 for driving the display device B 506 because the KMD driver wrapper 304 knows the DDI function addresses of the display device B 506.

After the DDI function addresses of all the KMD drivers are saved into the KMD driver wrapper 304, the filter driver 60 can be detached from the graphics kernel 204 (step S48). The flow in FIG. 4 terminates here.

According to an embodiment of the present invention, both the KMD driver A 405 and the KMD driver B 406 may correspond to one or more display devices. According to another embodiment of the present invention, the graphics kernel 204 is a Windows DirectX graphics kernel. The computer system is generally configured in WDDM architecture and the OS may be Windows Vista, Windows XP or any other system that supports MAMM. The graphics system may support OpenGL and/or DirectX.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for supporting multiple-adaptor multiple monitor in a computer system having multiple display drivers, comprising:
    initializing an operating system;
    sending a request from the operating system to a driver wrapper;

determining an identification of the request by the driver wrapper;
forwarding the request to a first display driver and a second display driver of the display drivers according to the identification; and
driving a first display device corresponding the first display driver and a second display device corresponding to the second display driver to perform the request by the first display driver and the second display driver of the display drivers; wherein each of the display drivers corresponds to multiple display devices, and each of the display devices possesses an unique identification;
wherein the first display driver of the display drivers comprises a first user-mode driver and a first kernel-mode driver, and the second display driver of the display drivers comprises a second user-mode driver and a second kernel-mode driver, wherein the driver wrapper comprises a user-mode driver wrapper corresponding to the first user-mode driver and the second user-mode driver, and the driver wrapper further comprises a kernel-mode driver wrapper corresponding to the first kernel-mode driver and the second kernel-mode driver.

2. The method of claim 1, further comprising relaying a response to the request from the one of the display drivers to the operating system by the driver wrapper.

3. The method of claim 1, wherein the initializing further comprises:
loading a filter driver;
intercepting an I/O request from the one of the display drivers by the filter driver;
transmitting data related to the identification of the one of the display drivers to the driver wrapper; and
transmitting identification of the driver wrapper to the operating system.

4. The method of claim 3, further comprising storing the data related to the identification of the one of the display drivers in the driver wrapper.

5. The method of claim 4, wherein the identification of the request is determined according to the stored data.

6. The method of claim 1, wherein the identification is a DDI function address, a manufacturer ID or a model ID.

7. The method of claim 1, wherein the operating system is Windows Vista or Windows XP.

8. A graphics system for supporting multiple display devices, comprising:
multiple graphics hardware units, comprising a plurality of first display devices and a plurality of second display devices;
a first display driver, configured to drive at least one of a the plurality of first display devices;
a second display driver, configured to drive at least one of the plurality of second display devices;
a subsystem of an operating system, configured to send a request; and a driver wrapper, configured to determine and dispatch the request according to a function address of the request;
wherein the request is forwarded to the first display driver if the function address is determined as corresponding to one of the first display devices, and the request is forwarded to the second display driver if the function address is determined as cox-responding to one of the second display devices;
wherein the first display driver comprises a first user-mode driver and a first kernel-mode driver, and the second display driver comprises a second user-mode driver and a second kernel-mode driver, wherein the driver wrapper comprises a user-mode driver wrapper corresponding to the first user-mode driver and the second user-mode driver, and the driver wrapper further comprises a kernel-mode driver wrapper corresponding to the first kernel-mode driver and the second kernel-mode driver.

9. The graphics system of claim 8, wherein the driver wrapper is further configured to return response corresponding to the request from the first display driver and/or the second display driver to the subsystem of the operating system.

10. The graphics system of claim 8, wherein the user-mode driver wrapper dispatches the request from the subsystem of the operating system to one of the first user-mode driver and the second user-mode driver, and the kernel-mode driver wrapper dispatches the request from the subsystem of the operating system to one of the first kernel-mode driver and the second kernel-mode driver.

11. The graphics system of claim 8, wherein the first display driver further comprises a first installed client display driver and the second display drivel further comprises a second installed client display driver, wherein the driver wrapper further comprises an installed client display driver wrapper corresponding to the first installed client display driver and the second installed client display driver.

12. The graphics system of claim 11, wherein the installed client display driver wrapper dispatches the request from the subsystem of the operating system to one of the first installed client display driver and the second installed client display driver.

* * * * *